United States Patent [19]

Ide

[11] Patent Number: 4,884,152
[45] Date of Patent: Nov. 28, 1989

[54] METHOD FOR RESTORING TRACK 0

[75] Inventor: Jun Ide, Furukawa, Japan

[73] Assignee: Alps Electric Co., Ltd., Japan

[21] Appl. No.: 290,836

[22] Filed: Dec. 28, 1988

Related U.S. Application Data

[63] Continuation of Ser. No. 15,449, Feb. 17, 1987, abandoned.

[30] Foreign Application Priority Data

Jun. 4, 1986 [JP] Japan .................................. 61-128221

[51] Int. Cl.$^4$ .......................... G11B 5/55; G11B 5/596
[52] U.S. Cl. ............................... 360/78.14; 360/77.08;
360/78.08; 360/78.13; 360/75; 318/685
[58] Field of Search ................. 360/75, 77.01, 77.02,
360/77.07, 77.08, 78.01, 78.04, 78.08, 78.12,
78.13, 78.14, 105; 318/685, 696; 369/32, 33, 41

[56] References Cited

U.S. PATENT DOCUMENTS

| | | | |
|---|---|---|---|
| 4,086,636 | 4/1978 | Cizmic et al. ........................ | 360/75 |
| 4,581,567 | 4/1986 | Yanagawa ........................... | 318/696 |
| 4,600,868 | 7/1986 | Bryant ................................ | 360/78 |
| 4,620,244 | 10/1986 | Krause ................................ | 360/78 |
| 4,683,504 | 7/1987 | Cantello et al. ..................... | 360/78 |
| 4,685,007 | 8/1987 | Nazarian et al. .................... | 360/78 |

FOREIGN PATENT DOCUMENTS

| | | | |
|---|---|---|---|
| 0154085 | 9/1985 | European Pat. Off. . | |
| 57-212665 | 12/1982 | Japan ................................. | 360/77 |
| 60-109015 | 6/1985 | Japan ................................. | 360/78 |

Primary Examiner—Alan Faber
Assistant Examiner—Steven R. Garland
Attorney, Agent, or Firm—Guy W. Shoup; Paul J. Winters

[57] ABSTRACT

A method for restoring the head to the track 0 in a disk drive unit which utilizes a stepping motor to position the head, the method comprising positioning the head to a position outside track 0 by exciting the stepping motor; returning the head thereafter toward an inner side to detect a position where the track 0 is found wihin a cycle of an excitation phase of the stepping motor; positioning the head at a position separated from the outer-most track 0 by a preset number of steps; and then controlling a current ratio to effect an excitation on a preset excitation phase, thereby positioning the head to the position over the track 0.

2 Claims, 6 Drawing Sheets

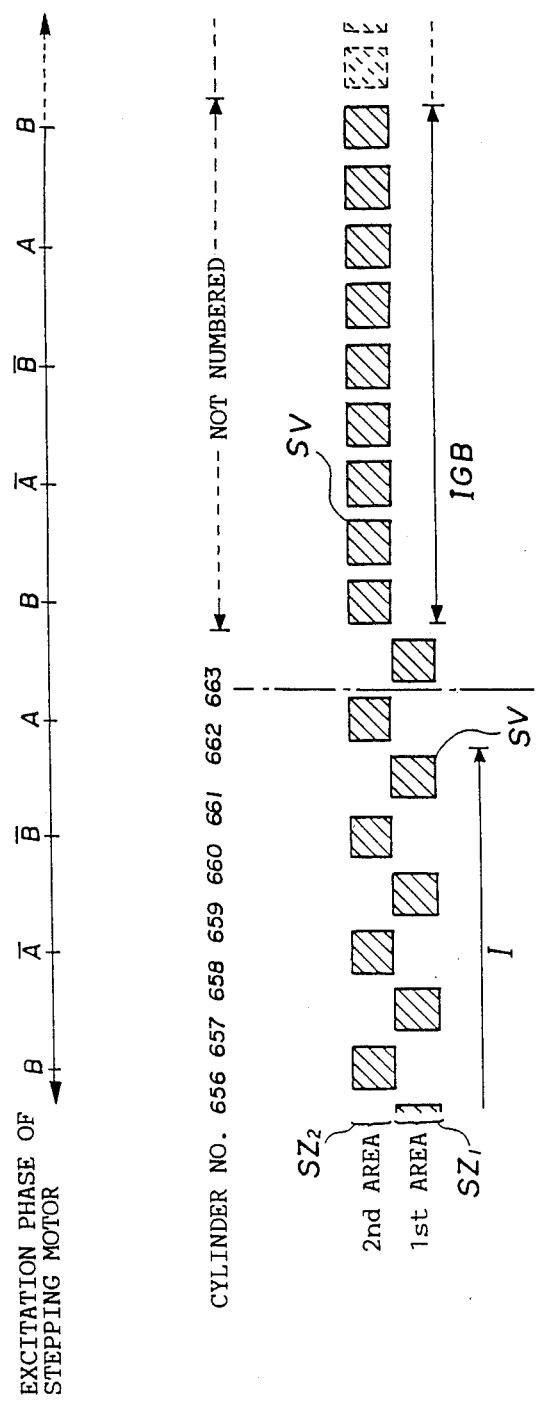

METHOD FOR RESTORING TRACK 0

This application is a continuation of application Ser. No. 015,449, filed 02/17/87 now abandoned.

BACKGROUND OF THE INVENTION

The present invention relates to a disk drive apparatus for effecting recording and/or reproducing of information on an information recording medium formed in a shape of a disk, and in particular, a method for restoring track 0 suitable for a so-called hard disk unit in which a recording medium is installed in an airtight housing so as to be rotated at a high speed.

DESCRIPTION OF THE PRIOR ART

There have been known various types of disk drive units, and in a compact disk drive unit in which a large amount of information is to be stored, a hard-type magnetic disk is used in many cases. For this type of magnetic disk drive unit, the improvement of the seek speed and accuracy are particularly to be considered because of the high rotation speed and the high recording density of the magnetic disk. When the seek operation is effected, the outer-most track, namely, the position of track 0 is used as the reference; consequently, the position of track 0 is required to be accurately detected in this kind of the disk drive unit.

FIG. 4 shows an example of such a hard disk unit, which comprises a magnetic disk 1 for recording information, a magnetic head 2 for achieving the recording and reproducing of information on the magnetic disk 1, a direct drive motor not shown (to be abbreviated as DD motor herebelow) for driving the rotation of the magnetic disk 1, a head drive mechanism 4 for moving the magnetic head 2 to a position over a desired track of the magnetic disk 1, a base plate 5 as a base of the housing in which the magnetic disk 1, the magnetic head 2, and the like are contained in the airtight state, a printed circuit board 6 in which a motor drive circuit, a control circuit, and the like are formed, and a frame not shown for mounting the printed circuit board 6 on the base plate 5.

In this magnetic disk unit, two sheets of magnetic disks 1 are installed. Since information is recorded on both surfaces of the magnetic disk 1 and the magnetic head 2 is provided for each surface, four magnetic heads 2 are mounted on a swing arm 8 of the head drive mechanism 4 by use of a retaining spring formed like a cantilever. The head drive mechanism 4 includes the swing arm 8, a steel belt 9 disposed on a portion of the swing arm 8, a pulley 10 on which an intermediate portion of the steel belt 9 is wound, and a stepping motor 11. The pulley 10 on which the steel belt 9 is wound is inserted into and is fixed on a driving shaft 12 of the stepping motor 11; consequently, when the stepping motor 11 is driven, the swing arm 8 can be swung about a rotation axis 8a as a center of the rotation.

The housing in which the magnetic disk 1, the magnetic head 2, the swing arm 8, the steel belt 9, and the pulley 10 are contained comprises the base plate 5 and a top cover now shown. To keep the airtightness, gaskets are used at the contact position between the base plate 5 and the top cover and at the position where the stepping motor 11 is mounted; moreover, a magnetic fluid is applied to the portion of the shaft of the DD motor 3. Furthermore, on the side 8b opposite to the side of the swing arm 8 on which the magnetic head 2 is installed, a shutter 17 is outwardly protruded. In addition, on the airtight room 5a of the base plate 5, a photointerrupter 18 is disposed as an outside sensor, so that the shutter 17 can be loosely inserted into a insertion path 18a of the photointerrupter 18. In this conventional example, when the magnetic head 2 reaches the position of the outer-most track 0, the shutter 17 is caused to interrupt the insertion path 18a of the photointerrupter 18.

When track 0 is to be restored, the magnetic head is moved at a low speed, so that the head 2 is immediately stopped when the head 2 is located at a position over the track 0. This is because if the magnetic head 2 is moved at a high speed, the head 2 cannot be appropriately stopped at a position over the track 0 when the head 2 reaches the track 0 and an error is thus occurs.

The track 0 restoration is achieved in the following cases. First, since the track position of the head is unknown at a power off, the head is returned to the track 0 to match the head position with the track counter of the drive unit by resetting the content of the counter; secondly, when a seek error occurs, the track 0 restoration is performed to confirm the head position; and thirdly, the seek operation is simply accomplished up to the track 0. In any cases, some means are required to detect the position 0. As such detecting means for detecting the position of the track 0, there have been known an optical means as described above and a magnetic means usually adopted to detect the position based on a rotation angle of the stepping motor. However, in these mechanical means, a sensor is required to be disposed in the proximity of the moving area or the rotating area of the arm 8 and the stepping motor 11, respectively. Consequently, when the miniturization of the apparatus is advanced, the sensor cannot be mounted in some cases, namely, the miniturization and reduction of the thickness of the system has been prevented. Moreover, as the recording density increases, the accuracy for detecting the track 0 becomes higher; however, for example, in a case of a photosensor, there exists a limit in association with the resolution, which leads to a problem that when the resolution is improved, the cost is increased.

SUMMARY OF THE INVENTION

It is therefore an object of the present invention to provide a method for restoring the head to the track 0 to remove the problem of the prior art technique which unnecessitates mechanical detecting means such as a photosensor and is capable of providing a disk drive unit which can be miniturized and can cope with a higher recording density.

To solve the problem of the prior art technique and to achieve the object, according to the present invention, there is provided a method for restoring the head to the track 0 in a disk drive unit in which an information recording medium formed in a shape of a disk is driven to be rotated and a head is moved by use of a stepping motor to effect a recording and reproducing of an information or to effect a recording or reproducing of an information, the method being achieved by detecting a position of the track 0 at the outer-most location in a recording area of the information recording medium comprising the following steps of: disposing a first area and a second area on the recording medium each for beforehand writing a servo information, said first and second areas being adjacent to each other in a radial direction of the information recording medium; writing the servo information in the recording area associated with one of said first and second areas and an area outside a track 0 and in the recording area associated with the other of said first and second areas and a preset area inside the recording area, said servo information being configured alternately in a zigzag shape in the first and second areas; positioning the head to a position outside the track 0 by exciting the stepping motor; returning the head thereafter toward an inner side to detect a position where the track 0 is found within a cycle of an excitation phase of the stepping motor; positioning the head at a position separated from the outer-most track 0 by a preset number of steps; and then controlling a current ratio to effect an excitation on a preset excitation phase, thereby positioning the head to the position over the track 0.

The means described above operate as follows.

That is, the surface of the information recording medium is divided into at least three areas, namely, a recording area (to be referred to as a data zone herebelow), a concentric area (to be referred to as an outer guard band herebelow) outside the data zone, and a concentric area (to be referred to as an inner guard band herebelow) inside the data zone. For the first and second areas disposed to be adjacent to each other in the radial direction of the three areas, the servo information is written, for example, in the outer guard band and the data zone associated with the first area and in the data zone and the inner guard band associated with the second area. The servo information thus written in the data zone are located in the first and second areas in an alternating fashion to form a zigzag shape. With such a magnetic disk, an excitation is effected for a predetermined phase of the stepping motor to detect an area of the disk over which the head is located. Based on the detection, the excitation is repetitiously achieved, for example, for each cycle until the head is located at a position over the outer guard band, so that the head is finally positioned to a position over the outer guard band including the track 0 within a cycle of the excitation phase. From the position, the excitation phase of the position of the track 0 is subjected to an excitation through adjusting the current ratio, thereby locating the head at a position over the track 0 with a high accurracy. This enables the track 0 restoration only by use of electric means.

BRIEF DESCRIPTION OF THE DRAWINGS

The objects and features of the present invention will become more aparent from the consideration of the following detailed description taken in conjunction with the accompanying drawings in which:

FIGS. 2(a)-2(c) are schematic diagrams for depicting the servo information written on the magnetic disk;

DESCRIPTION OF THE PREFERRED EMBODIMENTS

Referring now to the accompanying drawings, an embodiment of the present invention will be described.

Figure 1:
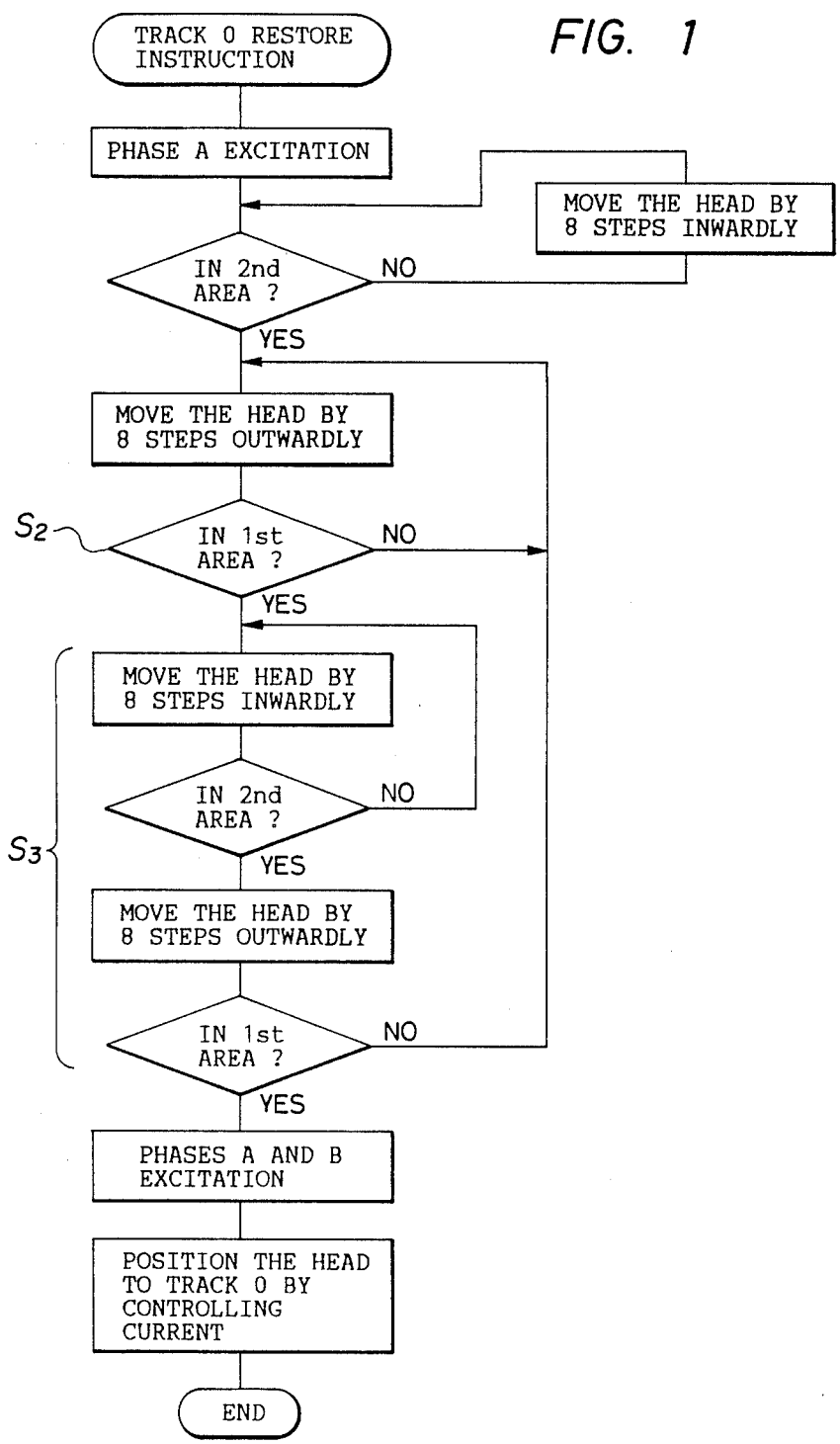
FIG. 1 is a flowchart illustrating a method of the track 0 restoration.
Figure 2B:
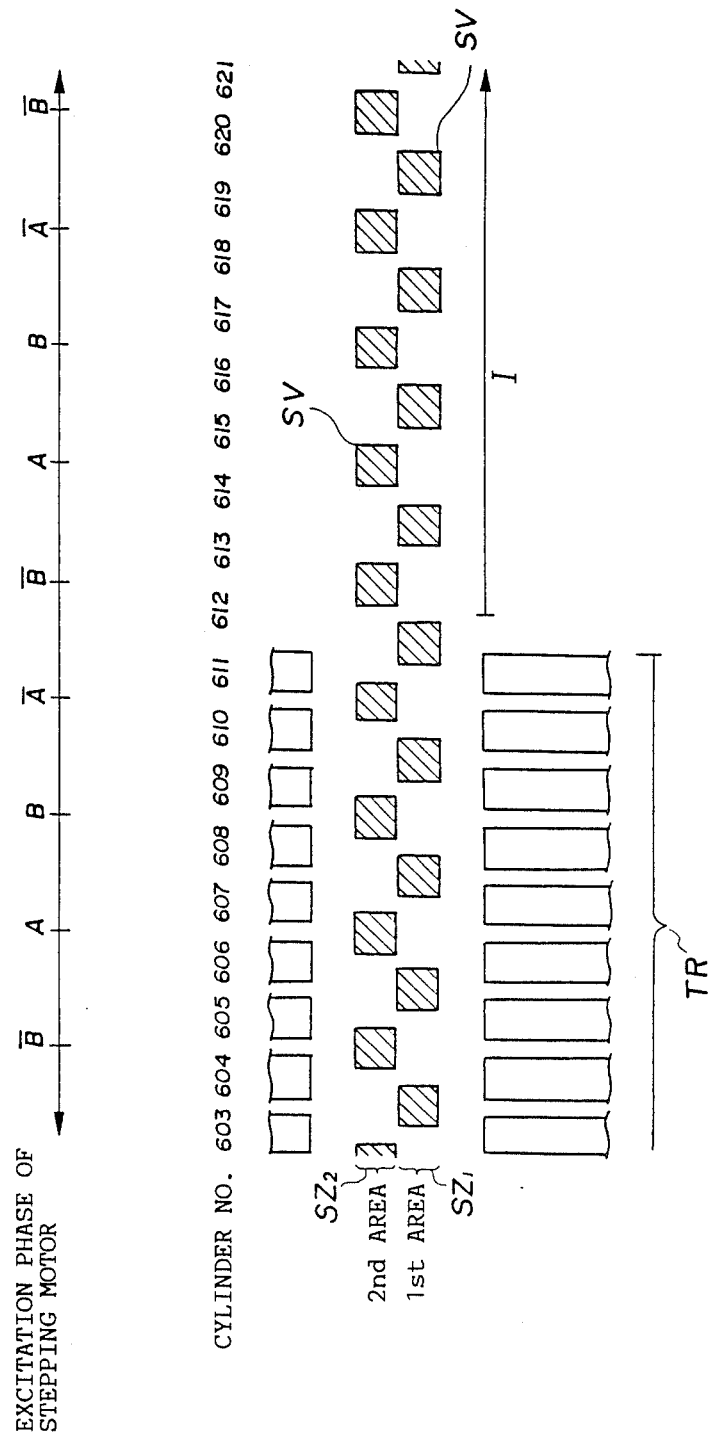
Figure 3:
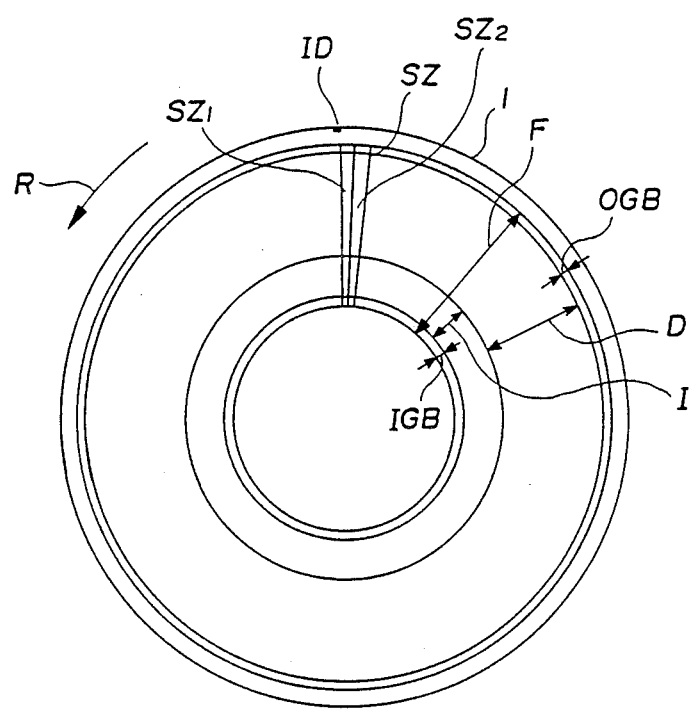
FIG. 3 is an explanatory diagram showing the respective areas of the magnetic disk.

FIGS. 1, 2(a), 2(b), 2(c), and 3 are diagrams for explaining an embodiment in which the method of the present invention is applied to a magnetic disk drive unit. FIG. 1 is a flowchart showing a track 0 restoring method according to the embodiment, FIGS. 2(a)-2(c) are explanatory diagrams for illustrating the servo information track positions, and FIG. 3 is a schematic diagram depicting positions where the servo information is written on the magnetic disk. In the following description, the components which are the same as those of the conventional example or which can regarded to be the same as those of the conventional example are assigned with the same reference numerals.

In FIG. 3, on the magnetic layer of the surface of the magnetic disk 1, there is formed an area F in which the head is guaranteed to be floating thereabove. The area F comprises an inner guard hand IGB, an inhibit zone I in which data cannot be recorded, a data zone D in which data is to be recorded, and an outer guard band OGB, these components being outwardly ordered beginning from the inner-most circle. The outer-most circle of the data zone D is the track 0, OT. The area F of the magnetic disk is further divided along the rotational direction into a plurality of sectors. Sectors positioned at locations near the index signal detect position ID downstream with respect to the rotation direction R constitute a servo zone SZ in which the servo information is written.

The servo information SV is written, as shown in FIGS. 2(a) through 2(c) the servo zone SZ divided into two portions including a first area $SZ_1$ upstream with respect to the rotation direction (indicated with an arrow mark) and a second area $SZ_2$ upstream with respect to the rotation direction. More concretely, a servo information SV associated with nine steps is written in the first area $SZ_1$ for the outer guard band OGB, whereas a servo information SV associated with nine steps is written in the second area $SZ_2$ for the inner guard band IGB. For the data zone D and the inhibit zone I, the servo information SV is beforehand written in the first and second areas at the phase 1 and phase 2 excitations, respectively of the stepping motor 11 to be described later. The servo information SV written in the first and second areas each contain the same signals, namely, the same information is recorded in the different areas.

The stepping motor 11 instantiated in FIG. 2 is of a 4-phase, unipolar type and the excitation phases are shown as A, B, $\overline{A}$, and $\overline{B}$. In the following description, the phases will be indicated by use of A B, $\overline{A}$ and $\overline{B}$.

Since the stepping motor 11 is of the 4-phase, unipolar type, four steps can be advanced by an excitation of phase 1 and four steps can be advance by an excitation of phase 2, and hence a total of eight steps can be advanced, namely, a cycle includes eight steps. With adoption of the stepping motor 11 and the servo information SV written as described above, when the phases A, B, $\overline{A}$, and $\overline{B}$ each are excited, only the servo information SV stored in the second area $SZ_2$ is detected for the inner guard band IGB, the inhibit zone I, and the data zone D. When each two phases of AB, B$\overline{A}$, $\overline{A}\overline{B}$, and $\overline{B}A$ are excited, only the servo information stored in the first area $SZ_1$ is detected for the inhibit zone I, the data zone D, and the outer guard band OGB. In the outer guard band OGB, the servo information SV of the first area $SZ_1$ is detected for both the first and second phase excitations; whereas in the inner guard band IGB, the servo information SV of the second area $SZ_2$ is detected for both first and second phase excitations. This enables to roughly correspond an excitation phase to an area over which the magnetic head 2 is located.

Next, referring to the flowchart of FIG. 1, a description will be given of an operation in a case where the track 0 restoration is accomplished for the magnetic disk 1 configured as described above. Since this flowchart is related to a stepping motor of a 4-phase, unipolar type, the reference of operation is set as a cycle comprising eight steps, for example. The number of steps is naturally varied according to the type and the control method of the stepping motor.

In FIG. 1, when a track 0 restore instruction for restoring the head to the track 0 is issued from a CPU not shown, phase A is first excited to check the servo information SV. If it is found that the servo information SV thus detected has been written in the first area $SZ_1$, the magnetic head 2 is assumed to exist at a position over the outer guard band OGB; whereas, if the servo information SV is found to have been written in the second area $SZ_2$, the magnetic head is assumed to exist over the data zone D, the inhibit zone I, or the inner guard band IGB. If the magnetic head 2 is over the outer guard band OGB (namely, the servo information is missing in the second area $SZ_2$), the phase A is excited, so that the head 2 is inwardly moved by eight steps per cycle to achieve a seek operation toward the data zone D. If the magnetic head 2 is over the data zone D, the inhibit zone I, or the inner guard band IGB, the phase A is similarly excited to accomplish a seek operation for each cycle to effect a detection to determine whether or not the servo information SV exists in the first area $SZ_1$. That is, this operation determines the first point of excitation of the phase A when the magnetic head 2 enters the outer guard band OGB from the data zone D. After the excitation point is detected, the magnetic head 2 is inwardly moved for a cycle to confirm that the head 2 is at a position over the data zone D. Thereafter, in the outer guard band OGB, the head 2 is located to the position Q associated with the phase A, the position Q being nearest to the data zone D. Next, the phase B is also excited for achieving the 2-phase excitation with the ratio of the current flowing for the phase A to that for the phase B being adjusted to be 1:3. The servo information SV in the first area $SZ_1$ and the second area $SZ_2$ are detected and then a fine adjustment of the current values for the phases A and B is effected to set the outputs of the servo information SV to be identical to each other, thereby locating the magnetic head 2 to a position over the track 0, 0T. The track 0 restore operation is accomplished through these processes.

In the flowchart described above, the process up to the second detect step $S_2$, in which a detection is effected to determine whether or not the head 2 exists in the first area $SZ_1$, achieve an operation to position the magnetic head 2 over the outer guard band OGB. The processes from the step in which the head 2 is subjected to a seek operation in the inward direction by eight steps to the step $S_3$ in which a detection is effected to determine whether or not the head 2 exists in the first area $SZ_1$. Accomplish a reconfirmation for determining that the head 2 actually exists within the eight steps of the cycle. The step $S_3$ enables to narrow the area in which the track 0 position OT is found.

Figure 4:
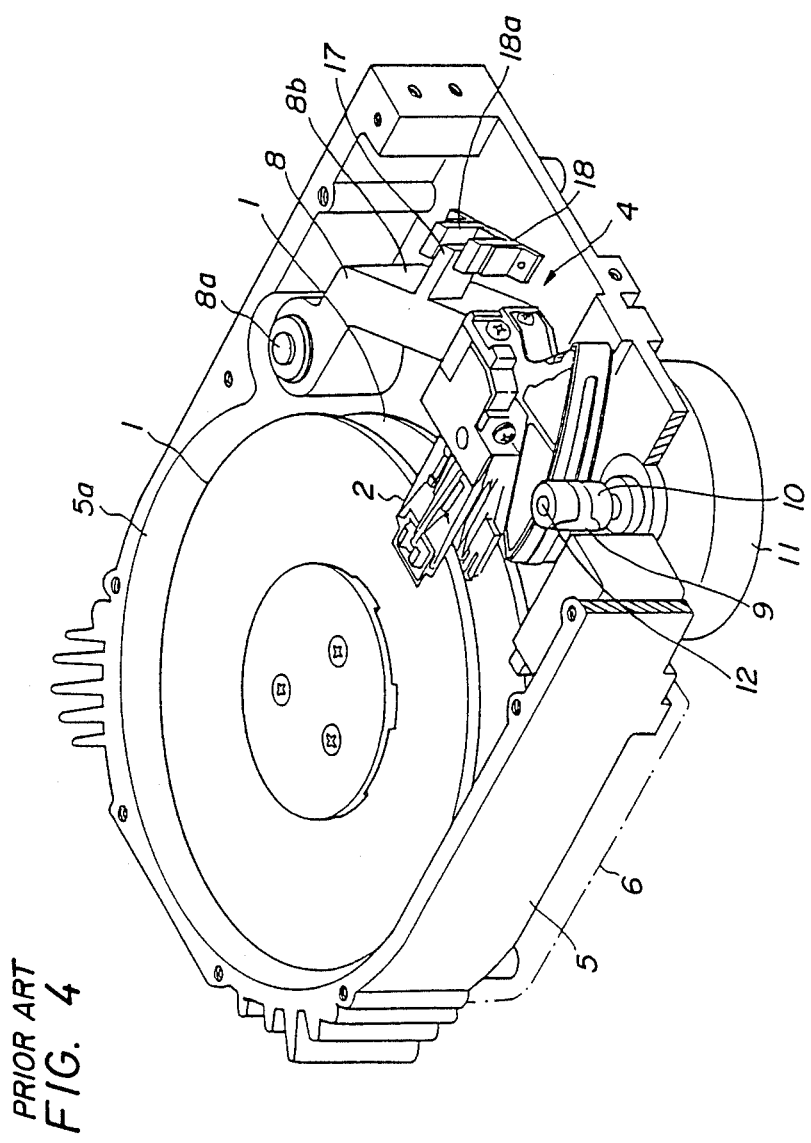
FIG. 4 is a perspective view of the substantial portion of the hard disk unit of the prior art example.

In this fashion, an electric processing is achieved with the servo information beforehand written in the magnetic disk 1, which enables to unnecessitate the photocoupler 18 and the shutter 17 extruding from the swing arm 8 shown in the conventional example of FIG. 4. Moreover, the detecting mechanism that operates in synchronism with the rotation shaft of the stepping motor 11 becomes also unnecessary, which makes it possible to miniturize the apparatus and to reduce the thickness of the apparatus.

The present invention has been described with reference to an embodiment of a hard disk unit but it is not restricted by the embodiment, namely, the present invention is naturally applicable to any disk drive unit in which the desired control can be achieved with the servo information written in the magnetic disk. Furthermore, various kinds of control methods can be selected according to the type of the apparatus and the kind of the stepping motor.

As can be seen from the description above, according to the present invention, the servo information is respectively written in advance in the different areas of the servo zone of a magnetic disk and the restoration of the magnetic head to the track 0 is enabled by detecting the servo information, thereby leading to various effects as follows.

1. Since mechanical detecting means for detecting the position of the track 0 becomes unnecessary, the magnetic disk drive unit can be further miniturized and the thickness thereof can be reduced.
2. The mechanical detecting means are associated with a limit of the resolution of the detecting means, which restricts the capability to cope with the higher recording density. However, the adoption of an electric detecting means allows to cope with the higher recording density.
3. By using the electric means, the accurracy and reliability which may be deteriorated or lowered due to, for example, the deterioration associated with the time aging of the apparatus can be prevented.
4. Moreover, since the mechanical configuration is unnecessary, the adjustment of the position of the track 0 becomes unnecessary, which reduces the number of necessary parts and hence the cost of product can be lowered.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A method for restoring a head to a track 0 in a disk drive unit in which an information recording medium formed in a shape of a disk is driven to be rotated and the head is moved by use of a stepping motor to effect a recording or reproducing of an information, the method being achieve by detecting a position of the track 0 at an outer-most location in a recording area of the information recording medium comprising the following steps of:

disposing a first area and a second area on the recording medium each for beforehand writing therein a servo information, said first and second areas being adjacent to each other in a rotational direction of the information recording medium;

writing the servo information in an area outside the track 0 in a portion of the first area, and writing the servo information in a portion of the second area inside the track 0, and writing the servo information configured alternately in a zigzag shape in a preset portion of the first and second areas inside the recording area;

positioning the head to a position outside the track 0 by exciting the stepping motor;

returning the head thereafter toward an inner side to detect a position where the track 0 is found within a cycle of an excitation phase of the stepping motor;

positioning the head at a position separated from the track 0 by a preset number of steps; and controlling thereafter a current ratio to effect an excitation on a preset excitation phase, thereby positioning the head to the position over the track 0.

2. A track 0 restoring method according to claim 1 wherein said stepping motor is of a 4-phase, unipolar type.

* * * * *